July 10, 1923.

S. E. DOUGLASS

HEADLIGHT MECHANISM

Filed March 28, 1922

Inventor
S. E. Douglass

By
Attorney

July 10, 1923.
S. E. DOUGLASS
HEADLIGHT MECHANISM
Filed March 28, 1922
1,461,604
2 Sheets-Sheet 2
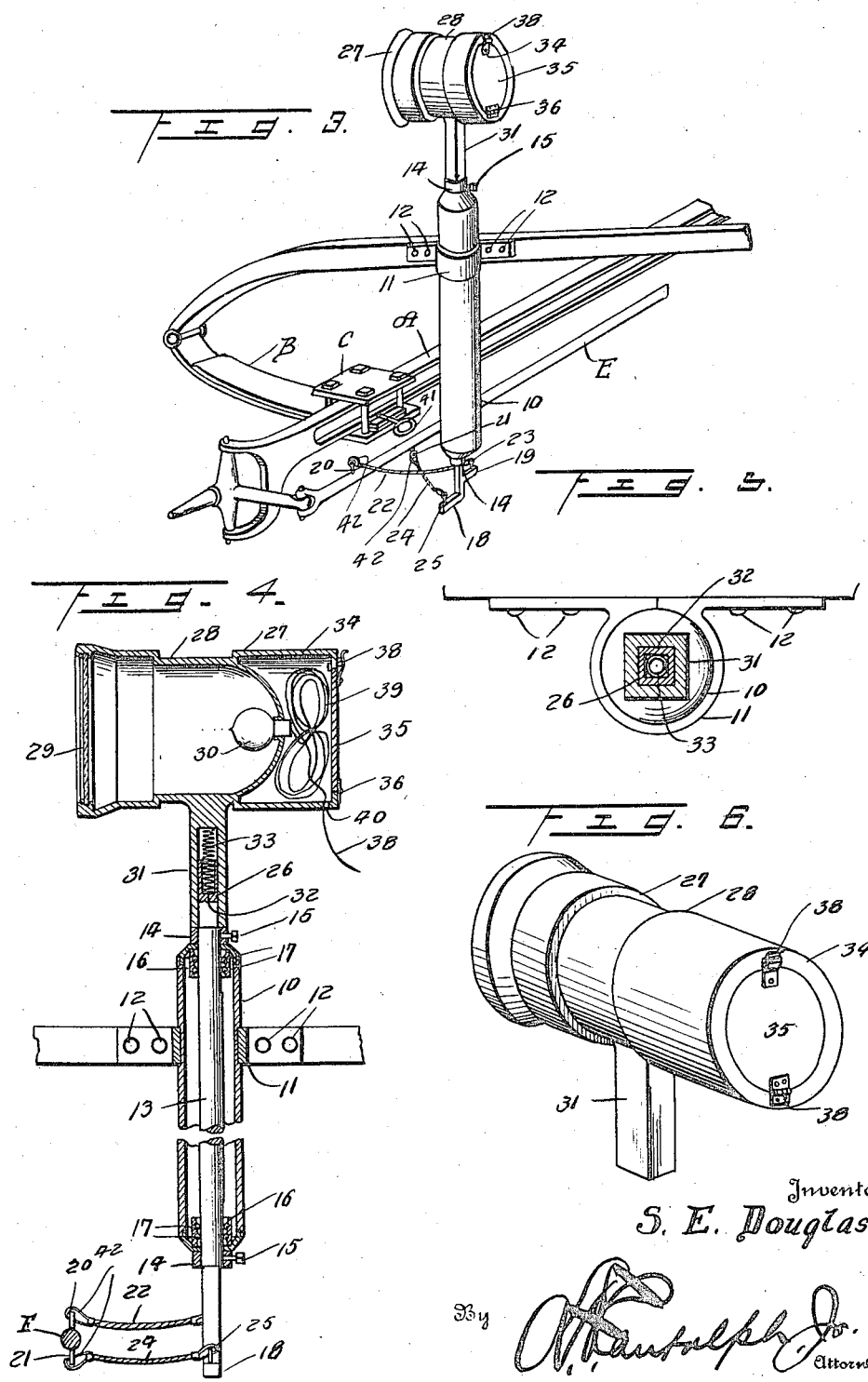
Inventor
S. E. Douglass
By
Attorney Patented July 10, 1923.

1,461,604

UNITED STATES PATENT OFFICE.

SAMUEL E. DOUGLASS, OF RALEIGH, NORTH CAROLINA.

HEADLIGHT MECHANISM.

Application filed March 28, 1922. Serial No. 547,488.

*To all whom it may concern:*

Be it known that I, SAMUEL E. DOUGLASS, a citizen of the United States, residing at Raleigh, in the county of Wake and State of North Carolina, have invented certain new and useful Improvements in a Headlight Mechanism; and I do hereby declare the following to be a full, clear, and exact description of the invention, such as will enable others skilled in the art to which it appertains to make and use the same.

This invention relates to automobile or other vehicle headlight mechanism.

An important object is to provide a novel means whereby the headlights of a vehicle will turn automatically or dirigibly with the vehicle through operation of its steering mechanism.

Another object is to provide a connection between the mounting for the lamp and the steering rod consisting of disalined elements on the mounting and crossing, non-contacting flexible elements connected to the disalined elements and to the steering rod.

A further object is to provide a construction in which the lamp is detachable, is illuminated electrically and has surplus wiring and a casing to contain it, whereby the lamp may be used as a trouble or general purpose lamp about the vehicle.

Additional objects and advantages will become apparent from a consideration of the description following taken in connection with accompanying drawings illustrating one practical embodiment.

In said drawings:—

Figure 3 is a perspective view illustrating the dirigible connection between the steering rod and one of the lamps;

Figure 4 is a central vertical sectional view through one of the lamps and its mounting, taken on the line 4—4 of Figure 1;

Figure 5 is a cross sectional view on the line 5—5 of Figure 1 with the detachable connection between one of the lamps and its support; and Figure 6 is a perspective view showing one of the lamps detached from its mounting and looking toward the rear of the lamp.

Like reference characters designate like or similar parts in the different views.

Figure 1:
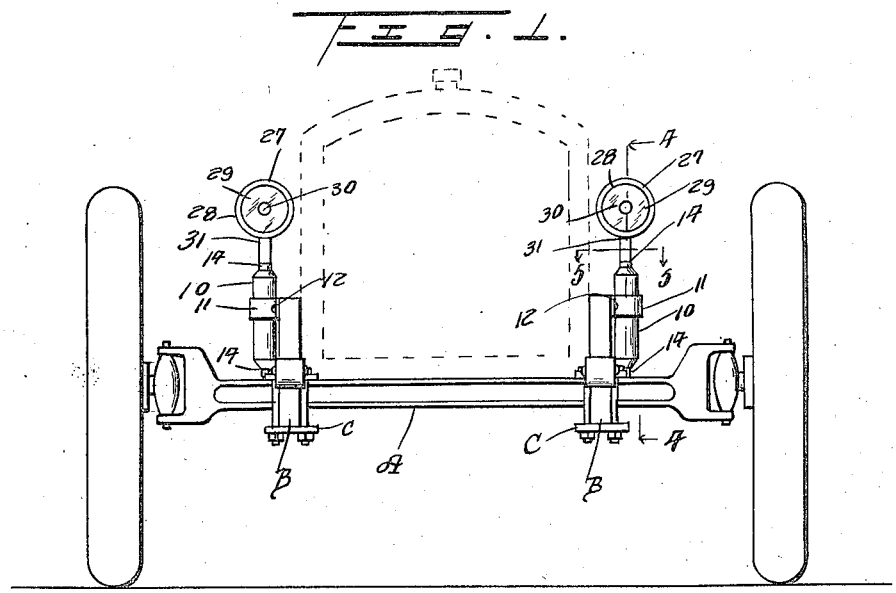
Figure 1 is a front elevation of an automobile showing the same equipped with my improved headlight mechanism.
Figure 2:
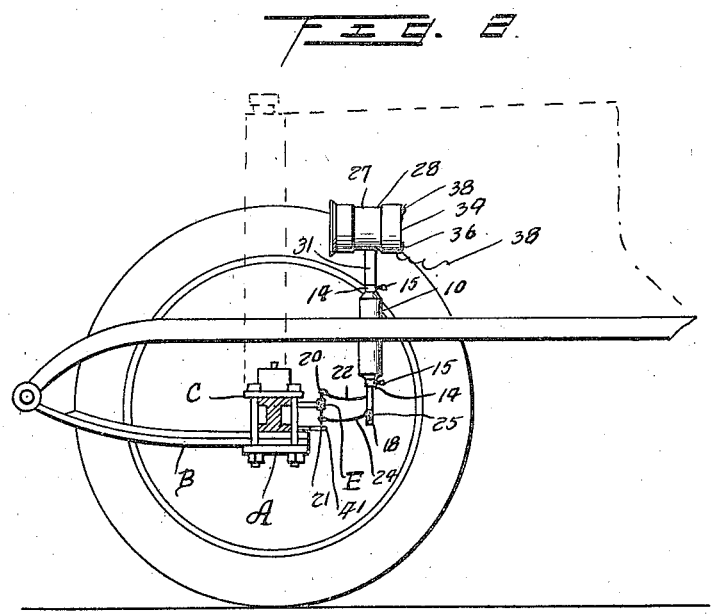
Figure 2 is a longitudinal sectional view through the parts of the automobile shown in Figure 1 and illustrating one of the headlights in side elevation.

Referring to the drawing, a vehicle, particularly an automobile is fragmentarily shown of which the front axle is designated A and through the medium of springs B clamped thereto as at C resiliently supporting side beams D of the chassis. The usual steering rod is shown at E for connection to the mounting spindles for the front wheels.

In reducing the invention to practice, a casing 10 may be provided for each lamp. The casings 10 are adapted to be secured in place in any suitable manner and at any suitable location. For instance they are shown as disposed in front of the axle A and fastened rigidly against the inner surfaces of the side beams B as by means of brackets or clamps 11 screwed or bolted to the side beams as at 12. Journaled within each casing 10 is a shaft 13, which may be secured in place by means of collars 14 fastened to the shaft as by set screws 15, and placed one against the top of each casing and one against the bottom thereof. Within the casing, bearings 16 are provided in which the shafts 13 turn and which bearings preferably have balls or rollers at 17 to directly engage the shaft to reduce friction.

Adjacent the lower end, shafts 13 have lugs or crank elements 18 and 19, which extend in opposite directions and are disalined in a horizontal plane. Pins or eyelets 20 and 21 are provided on the steering rod E, projecting above and below the same, respectively, and flexible cables or cords 22 extend from the pins 20 to pins or eyelets 23 on the cranks 19 while flexible cables 24 cross the cables 22, being out of contact therewith and fastened to the eyelets 21 and to eyelets 25 on the cranks 18. Said cables 22 and 24 are slightly slack so that the lamps and casings may be moved vertically due to resilient action of the side beams D in use and so that vibration will not cause actuation of the lamp.

The upper ends of the shaft 13 are elongated and square as at 26. The headlights are shown at 27 and may be of any suitable construction. They may have housings 28 provided with lenses 29 therein and with an electric bulb 30 secured thereto.

Depending from the housings 28 are attaching sleeves 31, preferably square in cross section, and disposed slidably and detachably on the square portions 26. Portions 26 are recesses in their upper extremities as at 32 and expansive springs 33 are housed in the recesses and abut the interior of sleeves 31 so as to provide a resilient vibration-absorbing connection between the shaft portions 26 and the lamps.

At the rear of each lamp, a container 34 is provided and it may have a closure or door 35, hinged for opening as at 36 and having a fastening latch or the like as at 37. Lamp 38 may be lighted in any suitable manner as by means of wires 38 in circuit with the storage battery of the automobile or vehicle equipped with my improved headlights. The wires 38 are contained in a cord 39 which passes through an opening 40 into the container 34 and thence to the lamp 30. It will be noted that the surplusage of the cord 39 is provided and disposed within the container 34. Thus in view of the detachment of the lamp 27, it may be used as a trouble lamp about the automobile, with the slack or surplusage of the cord 39 permitting extension and movement.

In operation, as the automobile is driven and the steering wheel is operated, the steering rod E will move appropriately to steer the front wheels. According to the movement of said steering rod E, through the medium of the flexible elements 22 and 24, shafts 13 are rocked or turned about vertical axes, imparting corresponding movement to the lamps 27 in order that their rays will always be directed in the course followed by the vehicle.

Due to the noncontiguous relation of the cables 22 and 24, wear of one on the other is avoided and also interference of movement of one with the other is overcome.

In order to prevent undue wear of the movable parts in daylight, that is when the lamps are not lighted and their dirigible action is not needed, provision is made to secure the lamps against movement. This end may be attained in any suitable manner. For instance, an eyelet 41 may be located on a fixed part of the vehicle, one adjacent each lamp, and the cables 22 and 24 may be detachably secured to the eyelets 20 and 21 as by means of snap fastenings 42 so that each pair of cables is transferable to engage an eyelet 41 to hold the lamp against dirigible movement.

The lamps 27 may either be used at any desired time as a trouble or general purpose lamp by detaching it from the proper shaft 13 as will be understood.

As merely one practical embodiment has been illustrated and described, it is to be understood that changes in the details may be resorted to provided they fall within the spirit and scope of the invention.

I claim as my invention:—

1. In a headlight mechanism, in combination with a vehicle steering rod, a lamp, a shaft to mount the lamp, means to mount the shaft, said shaft having lugs extending therefrom in opposite directions, said lugs being disalined vertically, said steering rod having a connection extending upwardly therefrom and a connection depending therefrom, flexible elements in crossed relation and non-contiguous, said elements extending one from each lug and being secured one above and one below and respectively to said connections.

2. In a headlight mechanism, a casing, means to secure said casing to the chassis of the vehicle, a shaft journaled in said casing, bearings for the shaft within the casing, collars on the shaft engaging opposite ends of the casing, the upper extremity of the shaft being square, a lamp having a sleeve of square cross sectional configuration slidably and detachably engaging said end said end having a recess, a cushioning spring in said recess in engagement with said sleeve, lateral lugs on said shaft below the casing disposed at different elevations and extending in opposite directions, and means extending from said lugs for attachment to the steering mechanism of a vehicle.

In testimony whereof I affix my signature in presence of two witnesses.

SAMUEL E. DOUGLASS.

Witnesses:
CLYDE A. DOUGLASS,
J. R. LOWERY.